United States Patent
Shimosaki

[15] 3,656,373
[45] Apr. 18, 1972

[54] CONTROL SYSTEM FOR AN AUTOMATIC TRANSMISSION

[72] Inventor: Tetsuo Shimosaki, No. 556, Shimomachiya, Kabe-cho, Asa-gun, Shiroshima, Japan

[22] Filed: Oct. 30, 1969

[21] Appl. No.: 872,627

[30] Foreign Application Priority Data

Oct. 31, 1968 Japan..................................43/79508
Oct. 31, 1968 Japan..................................43/79511

[52] U.S. Cl.............................................................74/869
[51] Int. Cl.......................................................B60k 21/02
[58] Field of Search...................................74/864, 869, 868

[56] References Cited

UNITED STATES PATENTS 3,255,642  6/1966  Christenson et al. ................74/869 X
3,400,613  9/1968  Johnson et al. ..........................74/869
3,494,223  2/1970  Mori....................................74/869 X Primary Examiner—Carlton R. Croyle
Assistant Examiner—Thomas C. Perry
Attorney—Sughrue, Rothwell, Mion, Zinn & Macpeak

[57] ABSTRACT

A control system for an automatic transmission for an automotive vehicle having a drive shaft, a driven shaft, means for providing low, intermediate, and high speeds between said shafts and including a plurality of friction members, a fluid source for supplying a fluid pressure to said respective friction members, a high speed shift valve, a low speed shift valve, and a timing valve. This control system provides a high efficiency control of the down-shifts of the transmission.

3 Claims, 4 Drawing Figures

INVENTOR

TETSUO SHIMOSAKI

BY *Sughrue, Rothwell, Mion, Zinn & Macpeak*

ATTORNEYS

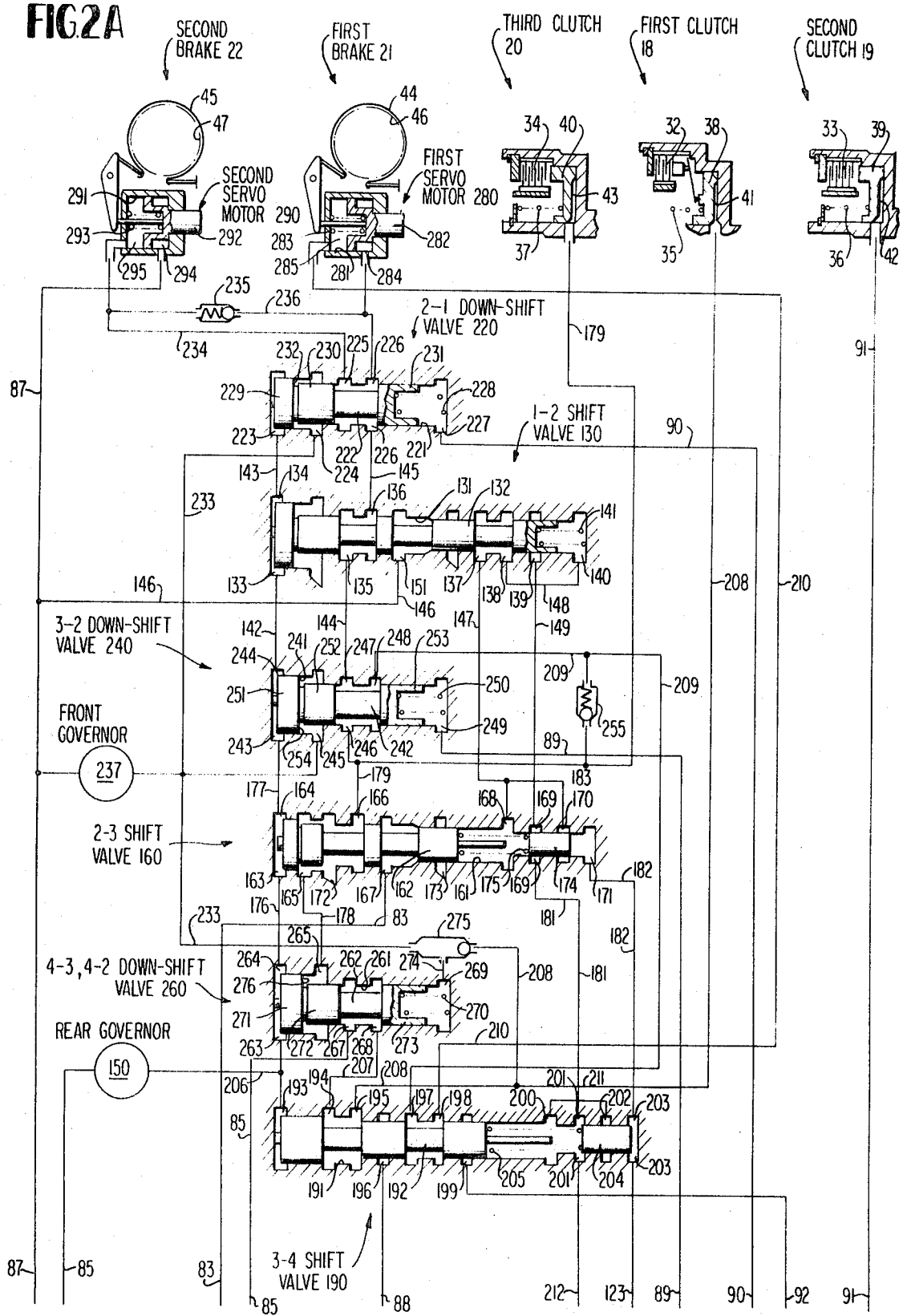

३,६५६,३७३

CONTROL SYSTEM FOR AN AUTOMATIC TRANSMISSION

SUMMARY OF THE INVENTION

This invention relates to a control system for an automatic transmission, and, more particularly, to a control system for an automatic transmission for establishing four forward speed ratios.

It is a primary object of the present invention to provide a control system for achieving a down-shift from a high speed drive ratio to a low speed drive ratio under the control of an accelerator pedal.

It is an object of the invention to provide a control system for providing a time lag between the disengagement of the high speed friction member establishing a high speed drive ratio and the engagement of a low speed friction member for establishing a low speed drive ratio, in order to increase the engine speed while the transmission is temporarily shifted to neutral drive as the transmission is down-shifted from the high speed drive ratio to the low speed drive ratio.

Particularly, it is an object to provide a control system for providing a time lag upon down-shifting from fourth speed drive ratio to third speed drive ratio, or from fourth speed drive ratio to second speed drive ratio by using the same control valve in the transmission having four speed ratios, wherein the third speed drive ratio and the second drive ratio are completed by the engagement of the same friction member. Thus, when the transmission is down-shifted from the fourth to the second speed ratio, the time lag must be larger than the time lag required when the transmission is shifted down from the fourth to the third speed ratio.

It is another object of the present invention to provide a control system which connects the aforesaid control valve to the 2–3 shift valve so that the time lag of the down-shift from the fourth to the second speed ratio will be larger than the time lag of the down-shift from the fourth to the third speed ratio.

It is a further object of the present invention to provide a control system for controlling the aforesaid time lag by operating the control valve by means of a governor pressure to be supplied from hydraulic governors provided on the drive and driven shafts of the transmission.

It is a still further object of the present invention to provide a control system to complete a low speed drive ratio without the various governor pressures acting on the aforementioned control valve when a transmission selector lever is shifted to a low range position from the drive range position, with the transmission operating in high speed drive ratio.

It is still another object of the present invention to provide an improved control system for moving the shift valve from a high speed position to a low speed position by increasing a throttle pressure stepwise in response to the depression of the accelerator pedal, the throttle pressure being supplied from a throttle valve connected to an accelerator pedal when the accelerator pedal is in the kick-down position.

The aforementioned and other features and advantages of the present invention will become apparent from the following description taken in conjunction with the accompanying drawings.

BRIEF DESCRIPTION OF THE DRAWINGS

FIGS. 2A and 2B are partial views of a hydraulic control system of the present invention, with both drawings in connection with each other showing a complete control system.

DETAILED DESCRIPTION OF THE INVENTION

Figure 1:
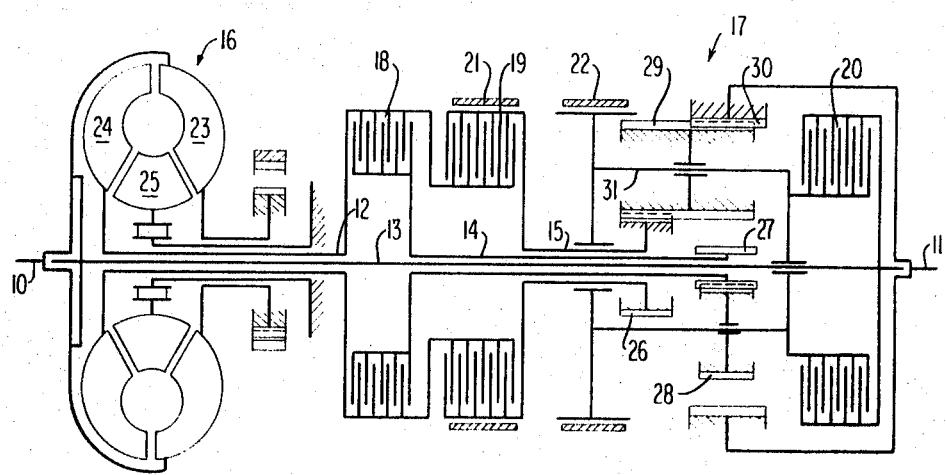
FIG. 1 is a schematic view of a transmission adapted to utilize the control system of the present invention.

Referring now to the drawings, and particularly, to FIG. 1 showing a schematic view of the transmission used with the present control system, the transmission comprises a drive shaft 10, a driven shaft 11, a first intermediate shaft 12, a second intermediate shaft 13, a third intermediate shaft 14 and a fourth intermediate shaft 15, all of which are co-axially disposed with each other and are rotatably located within a casing. The transmission also includes a torque converter 16, and a planetary gear set 17 coupled to the input shaft 10 and output shaft 11. A first clutch 18, a second clutch 19, a third clutch 20, a first brake 21 and a second brake 22 are used to shift the planetary gear set 17.

The torque converter 16 has a pump 23, connected to input shaft 10, a turbine 24 connected to first intermediate shaft 12 and a stator 25.

The planetary gear set includes a front sun gear 26, a rear sun gear 27, short pinion gears 28, long pinion gears 29, a ring gear 30 and a gear carrier 31. The front sun gear 26 is integrally connected to the fourth intermediate shaft 15, the rear sun gear 27 is integrally secured to the third intermediate shaft 14, and the ring gear 30 is integrally connected to the driven shaft 11.

Front sun gear 26 is driven by the input shaft 10 through the torque converter 16 when second clutch 19 is engaged, while rear sun gear 27 is driven by input shaft 10 through torque converter 16 when first clutch 18 is engaged. Gear carrier 31 is driven directly by input shaft 10 through second intermediate shaft 12 upon engagement of third clutch 20.

The first, second and third clutches 18, 19 and 20 incorporate a plurality of friction plates 32, 33 and 34, springs 35, 36 and 37, pistons 38, 39 and 40 respectively. (See FIG. 2A). The pistons 38, 39 and 40 are slidably disposed within the bores 41, 42, and 43. The first and second brakes 21 and 22 utilizes friction bands 44 and 45, respectively. The friction bands 44 and 45 are applied to or loosened from drums 46 and 47 formed integrally with the fourth intermediate shaft 15 and the gear carrier 31, respectively.

The transmission, one example of which is shown, provides first, second, third and fourth speed drive ratios. When all of the clutches 18, 19 and 20, and the first and second brakes 21 and 22 are disengaged, the transmission is in neutral condition. From such a condition, if the clutches 18, 19 and 20, and the first and second brakes 21 and 22 are disengaged, the transmission is in neutral condition. From such a condition, if the clutches and brakes are engaged according to the following Table I, the various power trains are completed as shown.

TABLE I

| Speed ratio | First clutch | Second clutch | Third clutch | First brake | Second brake |
|---|---|---|---|---|---|
| First speed ratio drive | X | | | | X |
| Second speed ratio drive | X | | | X | |
| Third speed ratio drive | X | | X | | |
| Fourth speed ratio drive | | | X | X | |

"X" denotes the engagement of the friction elements.

"X" denotes the engagement of the friction elements.

As may be seen from Table I, when the transmission is down-shifted from the fourth to the third speed ratio drive, the first brake 21 is disengaged and the first clutch is engaged. When the transmission is down-shifted from the fourth to the second speed drive ratio, the third clutch 20 is disengaged and the first clutch 18 is engaged. It follows that, in the transmission of the example shown, in order to down-shift from the fourth to the third speed drive ratio, or to the second speed drive ratio, either one of the friction members required to complete the fourth speed drive ratio may be disengaged and the clutch 18 engaged.

Due to the speed differential between the rotating elements at the third speed drive ratio and second speed drive ratio, a time lag is required between the disengagement of the high speed friction member and the engagement of the low speed friction member in down-shifting from the fourth to the third speed drive ratio or from the fourth to the second speed drive ratio. This time lag may be controlled by controlling the fluid flow within the oil passage for engaging the first clutch 18.

An understanding of the foregoing operation will be obtained by reference to the following description of the operation of the preferred embodiment. The features of the various valves will be described with reference to FIG. 2A and 2B.

"REGULATOR VALVE"

The regulator valve 50 utilizes a piston 54 slidably disposed within a cylinder 53 for regulating the fluid pressure supplied from the oil pump 51 through the conduit 52.

"MANUAL VALVE"

The manual valve 60 includes a piston 62 slidably located within a cylinder bore 61. The cylinder 61 has oil passage ports 63,64,65,66,67,68,69,70,71,72, and 73 and oil exhaust ports 75, 76 and 77 in communication therewith. The piston 62 has lands 78, 79, 80, 81, and 82 positioned along its length. The piston 62 can be placed in selected positions of "P," "R," "N," "D," "3," "2," "1." "P" is parking position; "R" is a reverse drive position; "N" is a neutral position; "D": is an automatic drive range position; "3" is a third speed ratio lockup range position; "2" is a second speed ratio lockup range position; and "1" is a first speed ratio lockup range position.

The oil passage port 63 communicates with conduits 83 and 84; the oil passage port 64 communicates with a conduit 85; the oil passage port 65 communicates with conduit 55; the oil passage port 66 communicates with conduits 55 and 86; the oil passage port 67 communicates with a conduit 87; the oil passage port 68 communicates with a conduit 88; the oil passage port 69 communicates with a conduit 89; the oil passage port 70 communicates with a conduit 90; the oil passage port 71 communicates with a conduit 91; the oil passage port 72 communicates with the conduit 84; and the oil passage port 73 communicates with a conduit 92.

"THROTTLE VALVE AND KICK-DOWN VALVE"

The throttle valve 100 and kick-down valve 101 include a throttle piston 103 and kick-down piston 104 slidably positioned within a sealed cylinder 102. The cylinder 102 has oil passage ports 105, 106, 107, 108, 109 and 110, and oil exhaust ports 111 and 112 located along its length.

The throttle valve piston 103 has lands 113 and 114 thereon, and small diameter portions 115 and 116 having smaller diameter than that of the lands 113 and 114 located at each end. Pressure areas 117 and 118 are provided between the land 113 and the small diameter portion 115, and between the land 114 and the small diameter portion 116, respectively. The throttle piston 103 is urged leftwardly in the drawing by a spring 119. The oil passage port 105 communicates with the conduit 86; the oil passage port 106 communicates through an orifice 120 with a conduit 121; the oil passage port 107 communicates directly with the conduit 121; the oil passage port 108 communicates through a conduit 122 with the oil passage port 110 of the kick-down valve 101 and the oil passage port 109 in the kick-down valve portion 101 communicates with conduit 123. The conduit 122 is connected through a check valve 128 to the conduit 90.

The kick-down piston 104 is resiliently connected to the throttle piston 103 by a spring 124 and is connected at its other end to an accelerator pedal (not shown). The kick-down piston 104 has an annular groove 127 between the lands 125 and 126. Kick-down valve 101 has a kick-down position which allows communication between the oil passage ports 109 and 110 along the annular groove 127 by moving piston 104 to the right in FIG. 2B to compress the spring 124 and a normal position for communicating the oil passage port 110 with oil exhaust port 112.

"1–2 SHIFT VALVE"

The 1–2 shift valve 130 has a piston 132 slidably positioned within a cylinder 131. The cylinder 131 has oil passage ports 133, 134, 135, 136, 137, 138, 139, 140, and 151. The piston 132 is urged leftwardly in the drawing by a spring 141. The oil passage port 133 communicates with a conduit 142; oil passage port 134 communicates with a conduit 143; oil passage port 135 communicates with a conduit 144; oil passage port 136 communicates with a conduit 145; oil passage port 137 communicates with a conduit 147; oil passage ports 138 and 140 communicate with a conduit 148; oil passage port 139 communicates with a conduit 149; and oil passage port 151 communicates with a conduit 146. The piston 132 is urged rightward in the drawing by a first governor pressure supplied from a rear governor 150 fixed to the driven shaft 11 for providing first governor pressure proportional to the speed of the driven shaft 11. Piston 132 is urged leftward in the drawing by the throttle pressure supplied from the throttle valve 100 for completeing the first and second speed drive ratios in response to the values of the first governor pressure and throttle pressure.

"2–3 SHIFT VALVE"

The 2–3 shift valve 160 incorporates a piston 162 slidably disposed within a cylinder 161. The cylinder 161 is formed with oil passage ports 163, 164, 165, 166, 167, 168, 169, 170 and 171, and oil exhausts ports 172 and 173. The piston 162 is urged leftward in the drawing by a spring 175 located between the piston 162 and movable plug 174. Piston 162 is moved to the low speed position for completing the second speed ratio drive or to the high speed position for completing the third speed ratio drive by the balance between the first governor pressure supplied from the rear governor 150 through conduit 176 and the throttle pressure supplied from the throttle valve 100.

The oil passage port 163 communicates with a conduit 176; oil passage port 164 communicates with a conduit 177; oil passage port 165 communicates with a conduit 178; oil passage port 166 communicates with a conduit 179; oil passage port 168 and 170 communicate with a conduit 183; oil passage port 169 communicates with conduits 181 and 149; and oil passage port 171 communicates with a conduit 182.

"3–4 SHIFT VALVE"

The 3–4 shift valve 190 has a piston 192 slidably disposed within a cylinder 191. Oil passage port 193, 194, 195, 196, 197, 198, 199, 100, 201, 202 and 203 are located along the length of the cylinder. The piston 192 is urged leftward in the drawing by a spring 205 disposed between the piston 192 and a movable plug 204. Piston 192 is moved from the low speed position to the high speed position for completing the fourth speed drive ratio by the balance between the first governor pressure supplied from the rear governor 150, and the throttle pressure supplied from the throttle valve 100. The oil passage port 193 communicates through a conduit 206 with the rear governor 150. The conduit 206 is to distribute the first governor pressure from the rear governor 150 to the 3–4 shift valve 190, 2–3 shift valve 160 and 1–2 shift valve 130, respectively.

The oil passage port 194 communicates with a conduit 207; the oil passage port 195 communicates with a conduit 208; the oil passage port 196 communicates with the conduit 88; the oil passage port 197 communicates with a conduit 210; the oil passage port 199 communicates with the conduit 209; the oil passage port 198 communicates with a conduit 92; the oil passage ports 200 and 202 communicate with a conduit 211; the oil passage port 201 communicates with the conduits 212 and 181; and the oil passage port 203 communicates with the conduits 123 and 182.

"2-1 DOWN-SHIFT VALVE"

The 2-1 down-shift valve 220 comprises a piston 222 slidably disposed within a cylinder 221. The cylinder 221 has oil passage ports 223, 224, 225, 226 and 227 along its length. The piston 222 is urged leftward in the drawing by a spring 228. A land 229, and small diameter lands 230 and 231 having smaller diameters than that of the land 229 are formed on piston 222. Pressure are 232 is provided between the lands 229 and 230.

The oil passage port 223 communicates with the conduit 143; the oil passage port 224 communicates with a conduit 233; the oil passage port 225 communicates with a conduit 234; the oil passage port 226 communicates with conduits 145 and 236 connected through a check valve 235 to the conduit 234 and the oil passage port 227 communicates with a conduit 90. The conduit 233 is connected to the front governor 237 fixed to the first intermediate shaft 12 for providing a second governor pressure proportional to the speed of the first intermediate shaft 12.

When the ratio of the first governor pressure acting on the lefthand side of the land 229 to the second governor pressure acting on the righthand side of the land 229 (pressure area 232) is of a predetermined value corresponding to the first speed ratio drive, the piston 222 is moved to the left to the low speed position for communicating between the oil passage ports 225 and 226. When the ratio of the first governor pressure to the second governor pressure becomes considerably less than a predetermined pressure ratio corresponding to the first speed ratio drive, the piston 222 is moved to the right in the drawing to the high speed position for closing the oil passage between the oil passage ports 225 and 226.

The 3-2 down-shift valve 240 comprises a piston 242 slidably disposed within a cylinder 241. The cylinder 241 has oil passage ports 243, 244, 245, 246, 247, 248 and 249 along its length. The piston 242 is urged leftward in the drawing by a spring 250. Land 251, and lands 252 and 253 having smaller diameter than the land 251 are located on piston 242. Pressure area 254 is provided between the lands 251 and 252. The oil passage port 243 communicates with the conduit 177; the oil passage port 244 communicates with the conduit 142; the oil passage port 245 communicates with the conduit 233; the oil passage port 246 communicates with the conduit 179; the oil passage port 247 communicates with the conduit 144; the oil passage port 248 communicates with the conduit 209 and the oil passage port 249 communicates with the conduit 89. The conduit 209 is connected through a check valve 255 to the conduit 179. The check valve 255 allows the fluid to flow from the conduit 179 to the conduit 209 and prevents flow in the reverse direction.

The piston 242 is moved to the left in the drawing to the low speed position for allowing communication between the oil passage ports 247 and 248 when the pressure ratio of the first governor pressure acting on the leftmost end of the land 251 to the second governor pressure acting on the pressure area 254 increases above a predetermined value corresponding to the second speed drive ratio in a manner similar to the 2-1 down-shift valve 220. The piston 242 is moved to the right to the high speed position for closing the oil passage between the oil passage ports 247 and 248 when the pressure ratio of the first governor pressure to the second governor pressure becomes smaller than the pressure ratio corresponding to the second speed drive ratio due to the reduction of the second governor pressure or the increase of the first governor pressure.

"4-3 or 4-2 DOWN-SHIFT VALVE"

The 4-3 or 4-2 down-shift valve 260 comprises a piston 262 slidably disposed within a cylinder 261. The cylinder 261 has oil passage ports 263, 264, 265, 267, 268 and 269 in communication therewith. The piston 262 is urged leftward in the drawings by a spring 270. A land 271, and lands 272 and 273 having smaller diameter than of the land 271 are positioned on piston 262. Pressure area 276 is provided between the lands 271 and 272. The oil passage port 263 communicates with the conduit 206; oil passage port 264 communicates with the conduit 176; oil passage port 265 communicates with the conduit 178; oil passage port 267 communicates with the conduit 85; oil passage port 268 communicates with the conduit 207; and oil passage port 269 communicates with the conduit 274. The conduit 274 communicates with the conduits 233 and 208 through a check valve 275. The check valve 275 allows the fluid to communicate between the conduits 233 and 274 or conduits 208 and 274, and prevents fluid from communicating between the conduits 233 and 208.

The piston 262 operates in conjunction with the 2-3 shift valve 160. When the pressure ratio of the second governor pressure to the first governor pressure increases above a predetermined pressure ratio corresponding to the second speed drive ratio while the piston 162 of the 2-3 shift valve 160 is in the low speed position, the piston 262 is moved to the left in the drawing to the low speed position to allow fluid communication between the oil passage ports 267 and 268. When the ratio of the second governor pressure to the first governor pressure becomes less than a predetermined pressure ratio corresponding to the second speed drive ratio, due to a reduction of the second governor pressure or an increase in the first governor pressure, while the piston 162 of the 2-3 shift valve 160 is in the low speed position, the piston 262 is moved to the right to the high speed position to close the oil passage between the oil passage port 267 and 268. Furthermore, when the pressure ratio of the second governor pressure to the first governor pressure increases above a predetermined pressure ratio corresponding to the third speed drive ratio while the piston 162 of the 2-3 shift valve 160 is in the high speed position, the piston 262 is moved to the left to the low speed position to communicate between the oil passage ports 267 and 268. Upon the ratio of the second governor pressure to the first governor pressure becoming less than a predetermined pressure ratio corresponding to the third speed drive ratio due to the reduction of the second governor pressure or increase in the first governor pressure, while the piston 162 is in the high speed position, the piston 262 is moved to the right or high speed position to close the oil passage between the oil passage ports 267 and 268. Thus, it can be seen that the 4-3 or 4-2 down-shift valve 260 operates in conjunction with the 2-3 shift valve 260 to cause a down-shift from fourth speed drive ratio to either third speed drive ratio or second speed drive ratio, depending on the speed condition of the automobile engine and drive shaft, as sensed by the front and rear governors.

"SERVO MOTORS"

The first servo motor 280 comprises a piston 282 slidably disposed within a cylinder 281. The piston 282 divides cylinder 281 into an apply chamber 284 and release chamber 285, and is urged to disengage the first brake 21 by a spring 283. The apply chamber 284 is connected to the conduit 236 and the release chamber 285 is connected to the conduit 210.

The second servo motor 290 comprises a piston 292 slidably disposed within a cylinder 291. The piston 292 divides cylinder 291 into an apply chamber 294 and a release chamber 295, and is urged to disengage the second brake 22 by a s1 ring 293. The apply chamber 294 communicates with the conduit 87, and the release chamber 295 is connected to the conduit 234.

"OPERATION"

Figure 2B:
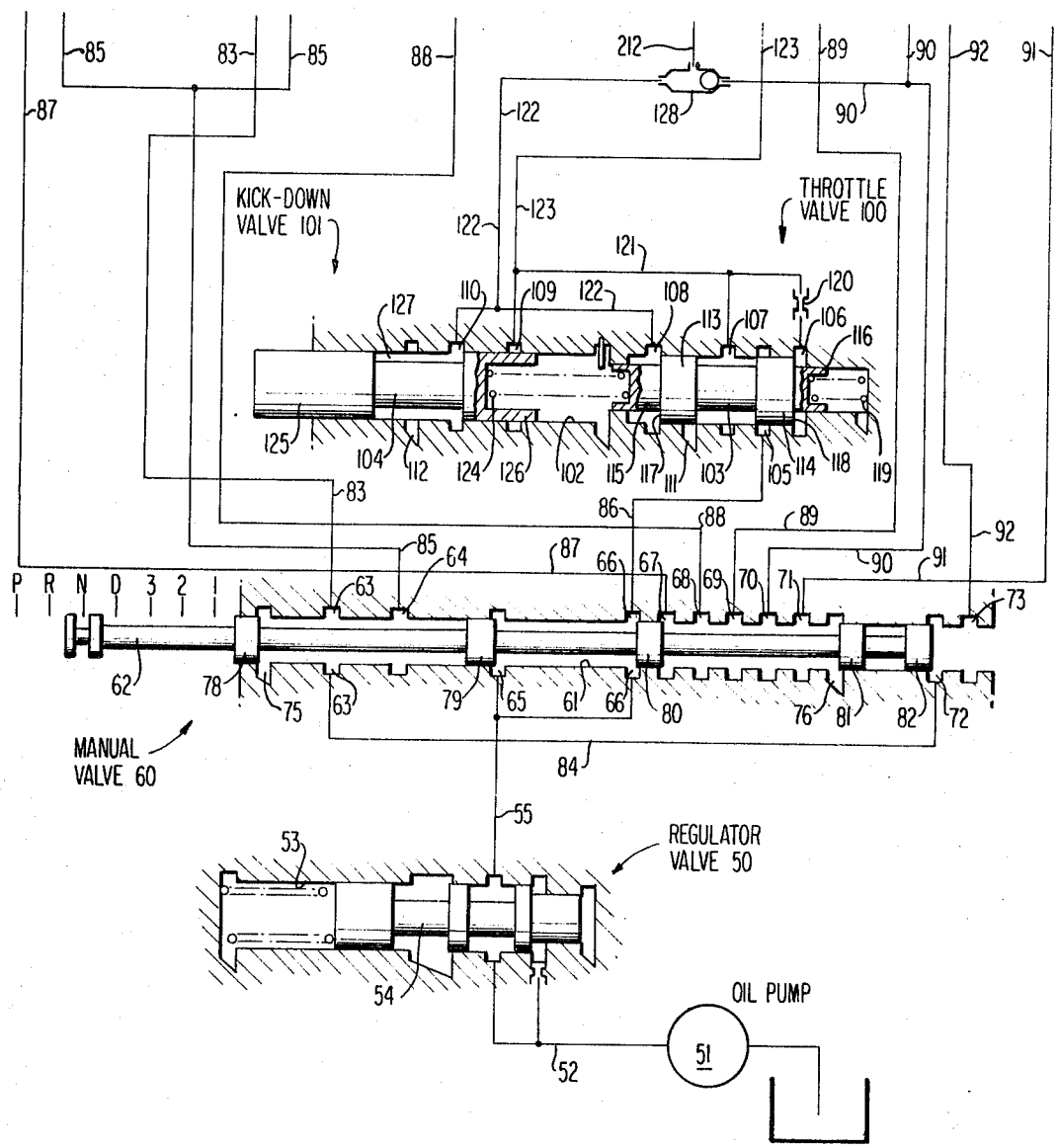

The operation of the preferred embodiment of the present invention will now be described. When the engine is started and the manual valve 60 is in the N position as shown in FIGS. 2A, and 2B, the oil pump 51 is operated to supply the oil to the conduit 52. The pressure of the oil in conduit 52 is regulated by the regulator valve 50 and is supplied to the conduit 55 as a line pressure. The line pressure is supplied to the oil passage ports 65 and 66 of the manual valve 60, and further, through the conduit 86 to the oil passage port 105 of the throttle valve 100. If the accelerator pedal is depressed, moving piston 125 of kick-down valve 101 to the right, the line pressure is supplied from the oil passage port 105 to the cylinder 102 to be supplied into the conduit 121 as a throttle pressure. The line pressure supplied into the cylinder 102 is communicated through oil passage port 107 to the conduit 121 and orifice 120 to the oil passage port 106, where the oil pressure acts on the pressure area 118 to urge the throttle piston 103 leftwardly in the drawing. Accordingly, the pressure of the oil supplied to conduit 121 from the cylinder 102 is determined by the balance between the force of the oil pressure acting on valve area 118 and the pressing force of the kick-down piston 104 for pushing the throttle piston 103 rightwardly in the drawing. Thus, the throttle pressure in conduit 121 increases proportionally to the amount of depression of the accelerator pedal.

The throttle pressure modified by throttle valve 100 is supplied to the oil passage port 109 of the kick-down valve 101 and the oil passage port 203 of the 3–4 shift valve 190 from the conduit 121 through the conduit 123. The throttle pressure supplied to the oil passage port 109 of the kick-down valve 101 is not supplied to the cylinder 102, because the oil passage port 109 is closed when the kick-down valve piston 104 is in the normal position. However, if the kick-down valve piston 104 is at the kick-down position, annular groove 127 connects oil passage port 109 with oil passage port 110 to allow the throttle pressure to be supplied from the oil passage port 109 through the oil passage port 110 and conduit 122 to the oil passage port 108. This operation will be described hereinafter with respect to the down-shift.

The throttle pressure supplied to the oil passage port 203 of the 3–4 shift valve is in turn, supplied to the oil passage port 171 of the 2–3 shift valve 160 through the conduit 182. Simultaneously, the throttle pressure supplied to oil passage port 203 moves the plug 204 in the leftward direction in the drawing to communicate the oil passage port 202 with oil passage port 203. Oil from conduit 123 is then supplied through the oil passage port 202 and the conduit 211 to the oil passage port 200 as a reduced throttle pressure, the amount of pressure reduction being determined by spring 205. The throttle pressure in conduit 211 after being reduced by a predetermined value, acts to urge the piston 192 of the 3–4 shift valve 190 in the leftward direction of the drawing. When piston 192 moves leftward, the oil passage between the oil passage ports 200 and 201 is closed by the plug 204. When the reduced throttle pressure acting on the piston 192 increases above a predetermined value, the plug 204 is moved in the rightward direction in the drawing so that passage ports 200 and 201 again communicate with each other and the excess oil is exhausted through the oil passage port 201, the conduit 212, check valve 128 and the conduit 90 to the oil exhaust port 76 of the manual valve 60. The throttle pressure supplied to the oil passage port 171 of the 2–3 shift valve 160 is reduced by a predetermined amount by the plug 174. The reduced throttle pressure supplied to oil passage port 171 is supplied to the oil passage port 168 through port 170 and conduit 183 to urge the piston 162 in the leftward direction of the drawing.

This reduced throttle pressure from oil passage port 170 in the 2–3 shift valve 160 is supplied through the conduits 183 and 147 to the oil passage port 137 of the 1–2 shift valve 130, and further, through the oil passage port 138 and the conduit 148 to the oil passage port 140 to urge the piston 132 in the leftward direction in the drawing.

When the piston of the manual valve 60 is moved to the D position, fluid communication between the oil passage ports 65 and 66 and the oil passage ports 63,64,67 and 72 is completed. Thus, the line pressure supplied from the conduit 55 is supplied to the conduits 83,84,85,86 and 87. The line pressure supplied into the conduit 83 is delivered to the oil passage port 167 of the 2–3 shift valve 160 and the line pressure supplied to the conduit 84 is supplied to the oil passage port 72 of the manual valve 60. The line pressure supplied into the conduit 85 is conveyed to the rear governor 150 and at the same time, to the oil passage ports 267 of the 4–3 or 4–2 down-shift valve 260. Since the 4–3 or 4–2 down-shift valve is in the lefthand position due to the force of spring 270, the line pressure is conveyed to port 268 and, thence, to the conduit 207 and the ports 194 and 195 of the 3–4 shift valve 190. From port 195, the line pressure is supplied by the conduit 208 to the space 41 of the first clutch 18 to apply the first clutch 18. As seen in Table I, the first clutch 18 is applied in all forward drive ranges except the fourth speed ratio drive.

The line pressure supplied to the conduit 87 is delivered to the oil passage port 151 of the 1–2 shift valve through conduit 146 and, at the same time to the front governor 237 and to the apply chamber 294 of the second servo motor 290. The line pressure applied to the apply chamber 294 moves the piston 292 in the leftward direction in the drawing to apply the second brake 22. Thus, as shown in Table I, the first clutch 28 and the second brake 22 are applied to start the vehicle in the first speed ratio drive.

As the vehicle starts to move, the rear governor 150 is rotated by the driven shaft 11 to supply the first governor pressure which increases in response to the increase of the speed of the driven shaft 11 within the conduit 206. This first governor pressure is supplied to the leftmost end surfaces of the pistons 192, 262,162,242,132 and 222 of 3–4 shift valve 190, 4–3 or 4–2 down-shift valve 260, 2–3 shift valve 160, 3–2 down-shift valve 240, 1–2 shift valve 130 and 2–1 down-shift valve 220, respectively, to urge the respective pistons in the rightward direction in the drawing. The piston 222 of the 2–1 down-shift valve 220, 220 is urged in the rightward direction of the drawing by the first governor pressure acting on the leftmost end of the land 229 and, at the same time is urged in the leftward direction by the second governor pressure supplied to the pressure area 232 from the front governor 236 through the conduit 233 and the spring 228. When the transmission is in the first speed drive ratio, it remains in the low speed ratio even if the first and second governor pressures are changed by an increase in the vehicle speed. This means that, even if the vehicle speed is varied so that the first and second governor pressures are changed, the speed ratio of the first intermediate shaft 12 and the driven shaft 11 remains the same. If the vehicle speed increases in speed to a point where the first governor pressure increases to a value high enough to overcome the leftward force of the second governor pressure and spring 141, the piston 132 of the 1–2 shift valve 130 is moved in the rightward direction against the spring 141 and the throttle pressure. The piston 132 moves rightward to the high speed position to close the oil passage ports 135 and 137 and allow the oil passage port 136 to communicate with port 151 and oil passage port 138 to communicate with port 139, respectively. Due to the rightward movement of the piston 132, the line pressure supplied from the conduit 146 is supplied to oil passage port 136 from oil passage port 151. Conduit 145 transmits the oil pressure to port 226 of the 2–1 down-shift valve 220, and, further, through the oil passage port 225 and conduit 234 to the release chamber 295 of the second servo motor 290. The line pressure supplied to release chamber 295, combined with the force of spring 293, acts to overcome line pressure in apply chamber 294, to move the piston 292 in the rightward direction so that the second brake 22 is disengaged. At the same time, line pressure is supplied through the conduit 236 to the apply chamber 284 of the first servo motor 280 to move the piston 282 in the leftward direction and engage the first brake 21. Accordingly, the second brake 22 is disengaged and the first brake 21 is engaged and, together with the first clutch 18 places the transmission in the second speed drive ratio. Thus, when the second speed drive ratio is completed, the speed ratio of the first intermediate shaft 12 to the driven shaft 11 decreases so that the combined force of the second governor pressure and the spring 228 is decreased with respect to the force of the first governor pressure for urging the piston 222 in the rightward direction, with the result being that the piston 222 of the 2–1 down-shift valve 220 is moved to the high speed position, the oil passage port 225 is closed by the land 230, with the result being that line pressure to the release chamber 295 of the second servo motor 290 is supplied from the conduit 236 through the check valve 235, instead of the conduit 234.

If the vehicle speed increases to a predetermined speed while it is running in the second speed drive ratio, the piston 162 of the 2–3 shift valve 160 is moved in the rightward direction in the drawing by the increasing force of the first governor pressure which overcomes the combined force of the reduced throttle pressure and spring 175 pushing the piston 162 in the leftward direction. Thus, the oil passage port 163 communicates with the oil passage port 165, the oil passage port 166 communicates with the oil passage port 167, and the oil passage port 168 communicates with the oil passage port 169. The first governor pressure supplied to the oil passage port 163 is supplied through the oil passage port 165 and conduit 178 to the oil passage port 265 of the 4–3 or 4–2 down-shift valve 260 to act on the pressure area 276 to combine with the force of spring 270 and push the piston 262 in the leftward direction in the drawing. The line pressure within the conduit 83 is supplied through the oil passage port 167 to port 166, and conduit 179. From the conduit 179, the line pressure is supplied into the space 43 of the third clutch 20 to engage the third clutch 20, and simultaneously, is supplied through the oil passage ports 246 and 248 of the 3–2 down-shift valve 240 to conduit 209, where the line pressure is conveyed to oil passage port 197 of the 3–4 shift valve 190. Since the 3–4 shift valve 190 is in the lefthand position, port 197 communicates with port 198 and line pressure is supplied to the conduit 210 and into the release chamber 285 of the first servo motor 280 to disengage the first brake 21. Thus, the third speed drive ratio is completed in the transmission. By the completion of the third speed drive ratio, the piston 242 of the 3–2 down-shift valve 220 is moved to the high speed position in a manner similar to the piston 222 of the aforementioned 2–1 down-shift valve 220 to close the oil passage between the oil passage ports 246 and 248 by the land 252.

As the vehicle speed further increases to a predetermined speed in the third speed ratio drive, the piston 192 of the 3–4 shift valve 190 moves in the rightward direction in the drawing by the increase of the first governor pressure above the combined forces of spring 209 and the throttle pressure acting in the opposite direction. By the rightward movement of the piston 192, the oil passage ports 194 and 197 are closed by the adjacent lands so that the oil passage ports 195 and 198 are connected to the oil passage ports 196 and 199, respectively. Thus, the line pressure supplied to the cavity 41 of the first clutch 18 is exhausted through the conduit 208, oil passage ports 195, and 196, and conduit 88 to the oil exhaust port 76 of the manual valve 60 to disengage the first clutch 18.

The line pressure supplied into the first servo motor release chamber 285 is exhausted through the conduit 210, oil passage ports 198 and 199, and conduit 92 to the oil exhaust port 77 of the manual valve 60 and thereby engage the first brake 21. In this manner the transmission completes the fourth speed drive ratio. By the completion of the fourth speed drive ratio, the piston 262 of the 4–3 or 4–2 down-shift valve 260 moves in the rightward direction to the high speed position to block communication between the lands 267 and 268 by the reduction of the second governor pressure supplied to the oil passage port 274 and the force for pushing the piston 262 in the leftward direction against the force for pushing the piston 262 in the rightward direction in a manner similar to the operation of the aforementioned 2–1 down-shift valve 220 and 3–2 down-shift valve 240.

As described previously, when the 1–2 shift-valve 130 is shifted to the high speed position, the transmission is shifted from the first speed drive ratio to the second speed drive ratio, and when the 2–3 shift valve 160 is shifted to the high speed position, the transmission is shifted from the second speed drive ratio to the third speed drive ratio, and further, when the 3–4 shift valve 190 is shifted to the high speed position, the transmission is shifted from the third speed drive ratio to the fourth speed drive ratio in the three up-shift conditions. Accordingly, when fourth speed drive ratio is reached, these shift valves are all held at their high speed positions. When the respective shift valves are moved to their high speed positions, the reduced throttle pressure acting on the righthand end surfaces of the respective pistons 132, 162, and 192, is exhausted to the oil exhaust port 112 of the kick-down valve 101 or the oil exhaust port 76 of the manual valve 60. This means that the reduced throttle pressure supplied to the oil passage port 138 of the 1–2 shift valve 130 is exhausted through the oil passage port 139, conduit 149, oil passage port 169 of the 2–3 shift valve 160. The reduced throttle pressure supplied to the oil passage port 168 of the 2–3 shift valve 160 is exhausted through the oil passage port 169, conduit 181, and oil passage port 201 of the 3–4 shift valve 190 to conduit 212. The reduced throttle pressure supplied to the oil passage port 200 of the 3–4 shift valve 190 is exhausted through the oil passage port 201 and conduit 212 to the oil exhaust port 112 of the kick-down valve 101 or the oil exhaust port 76 of the manual valve 60.

The down-shift from the high speed drive ratio to the low speed drive ratio upon full depression of the accelerator pedal will now be described.

Figure 3:
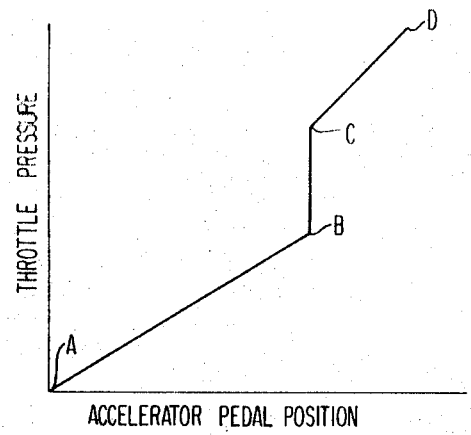
FIG. 3 is a graphical representation of the throttle pressure characteristics versus change of the position of the accelerator pedal.

If the accelerator pedal is depressed so as to down-shift the transmission from the fourth speed drive ratio to a lower speed drive ratio such as when passing another vehicle or climbing a steep hill, the piston 104 of the kick-down valve 101 is moved to the right to the kick-down position to close the oil exhaust port 112 by the land 125 and allow communication between the oil passage ports 110 and 109. The throttle pressure supplied from the conduit 123 is supplied through the oil passage ports 109 and 110 to the oil passage port 108 to act on the pressure area 117 and assist the spring 124 in pushing the throttle piston 103 in the rightward direction. Because of this increase in force on the lefthand side of piston 103, the throttle pressure supplied into the conduit 121 increases stepwise from the normal characteristic of the throttle pressure, shown by the line A–B in FIG. 3, to that indicated by the line C–D in FIG. 3. This stepwise increase is caused by the balance between the combined force of the spring 119 and the throttle pressure acting on the pressure 118 for pushing the throttle piston 103 in the leftward direction and the force of the spring 124 and the throttle pressure acting on the pressure area 117 for pushing the throttle piston 103 in the rightward direction. This means that, at the normal position of the kick-down valve piston 104, the throttle pressure is held along the line A–B in FIG. 3 by the balance of the change of the force of the spring 124 alone when the kick-down piston 104 moves in the rightward direction. However, at the kick-down position, the throttle pressure acting on the pressure area 117 is added to the force of the spring 124 for pushing the throttle piston 103 in the rightward direction. The throttle pressure is therefore held at a higher pressure along the line C–D than the pressure along the line A–B. This increase in the throttle pressure is in the amount of the pressure along the line B–C. Since the throttle pressure increases in proportion to the depressing amount of the accelerator pedal along the line C–D at the kick-down position, the operation of the respective shift valves will be accurately maintained, regardless of any variation in the line pressure supplied from the oil passage port 105.

The increased throttle pressure is supplied through the conduit 122, check valve 128 and conduit 212 to the oil passage port 201 of the 3–4 shift valve 190, through the conduit 181 to the oil passage port 169 of the 2–3 shift valve 160, and further, through the conduit 149 to the oil passage port 139 of the 1–2 shift valve 130 to urge the pistons 192, 162, and 132, respectively, in the leftward direction in the drawing. Therefore, if the vehicle speed or the speed of the driven shaft 11 is such that a down-shift from the fourth to the third speed drive ratio is possible, but a down-shift from the fourth to second speed drive ratio is impossible, only the piston 192 of the 3–4 shift valve 190 will move from the high speed to the low speed position. Such a condition is determined by the force of the first governor pressure on the lefthand ends of the shift valves and by the throttle pressure on the righthand ends thereof. If the piston 192 is moved to the low speed position, the oil communication is obtained between the oil passage port 195 and the oil passage port 194 and between the oil passage port 197 and the oil passage port 198 respectively, with the result that the line pressure supplied from the conduit 83 through the oil passage ports 167 and 166 of the 2-3 shift valve 160, the conduit 179, and check valve 255 to the conduit 209 is supplied through the oil passage ports 197 and 198, and conduit 210 to the release chamber 285 of the first servo motor 280, where the line pressure combines with the force of spring 283 to move the piston 282 in the rightward direction against the line pressure within the apply chamber 284 to disengage the first brake 21. Since the oil passage 208 connected to the cavity 41 of the first clutch 18 for completing the third speed drive ratio and the connection between the oil passage ports 267 and 268 of the 4-3 or 4-2 down-shift valve 260 is blocked by the land 272, the first clutch 18 is not engaged.

For this reason, since only the third clutch 20 is engaged, the transmission is placed in a neutral condition to allow an increase in the engine speed. If the speed of the first intermediate shaft 12 increases to the speed corresponding to the speed ratio of the drive and driven shaft speeds at the third speed drive ratio, the piston 262 of the 4-3 or 4-2 down-shift valve 260 moves in the leftward direction, due to the increase of the second governor pressure acting on the right end of the piston 262. Thus, when the speed of the second intermediate shaft 12 increases to a speed corresponding to the speed ratio between the drive and driven shaft speeds at the third speed drive ratio, the second governor pressure reaches a value high enough to overcome the force of the first governor pressure acting on the lefthand area of land 271 minus the pressure area 276, and move piston 262 in the rightward direction in the drawing. The pressure ratio between the governor pressure at which this movement occurs in the previously discussed pressure ratio at the third speed drive ratio of the first and second governor pressures.

If the piston 262 is moved to the low speed or lefthand position, the line pressure supplied to the conduit 85 is supplied through the oil passage ports 267 and 268, conduit 207, oil passage ports 194 and 195 of the 3-4 shift valve 190 and conduit 208 to the cavity 41 of the first clutch 18 to engage the first clutch 18. Thus, the transmission is placed in the third speed drive ratio.

At the kick-down from the fourth speed drive ratio, if the piston 162 of the 2-3 shift valve 160 moves in the leftward direction in the drawing, together with the piston 192 of the 3-4 shift valve 190 moving in the leftward direction, the oil passage port 166 is connected to the oil exhaust port 172 so that the line pressure supplied to the cavity 43 of the third clutch 20 is exhausted to the oil exhaust port 172 of the 2-3 shift valve 160 through the conduit 179, and third clutch 20 is thus disengaged. Since the oil passage 208 connected to the cavity 41 of the first clutch 18 for completing the second speed ratio drive cannot be supplied with line pressure, since communication between the oil passage ports 267 and 268 of the 4-3 or 4-2 down-shift valve 260 is blocked by the land 272, the first clutch 18 is not engaged. Accordingly, the transmission is placed in a neutral condition to increase the engine speed in a manner similar to the 4-3 down-shift. If the speed of the second intermediate shaft 12 increases to a speed corresponding to the speed ratio between drive and driven shafts at the second speed drive ratio compared to the speed of the driven shaft 11 as the engine speed increases, the piston 262 is moved in the leftward direction in the drawing by the increase of the second governor pressure acting on the righthand end of piston 262. The oil passage port 165 is connected to the oil exhaust port 172 by the leftward movement of piston 162 of the 2-3 shift valve 160 so that the first governor pressure acting on the pressure area 276 of the 4-3 or 4-2 down-shift valve 26 is exhausted through the conduit 178 and oil passage port 165 to the oil exhaust port 172, with the result being that the force for pushing the piston 262 of the 4-3 or 4-2 down-shift valve 260 in the rightward direction in the drawing is greater than that in the case of a 4-3 down-shift.

The second governor pressure acting to move the piston 262 in the leftward direction against the first governor pressure increases, due to an increase in the engine speed, until the pressure becomes equal to a value higher than the corresponding pressure in the case of a 4-3 down-shift, or, stated another way, the governor pressures reach a predetermined pressure ratio corresponding to the second speed drive ratio. Thus, if the piston 262 is moved to the left to the low speed position, the line pressure is supplied to the cavity 41 of the first clutch 18 through conduit 208 in a manner similar to that of the 4-3 down-shift to engage the first clutch 18. The transmission is now in the second speed ratio.

From the foregoing, it can be seen that the 4-3 and 4-2 down-shift creates a time lag between the disengagement of the friction member required for the high speed ratio and the engagement of the friction member required for the low speed ratio, and this time lag is of an optimum length, as determined by the 4-3 or 4-2 down-shift valve 260. The reason for the lag between a plurality of down-shifts being controlled at an optimum value by a single down-shift valve, as discussed above, is due to the fact that the 2-3 shift valve 160 for completing the second speed drive ratio in the low speed position and the third speed drive ratio in the high speed position is operatively combined with the 4-3 or 4-2 down-shift valve 260 to change the pressure area on which the first governor pressure operates in opposing the second governor pressure by detecting the position of the piston 162 of the shift valve 160.

The down-shifts from the third speed drive ratio to the second speed drive ratio, and from the second speed drive ratio to the first speed drive ratio may also be controlled at an optimum value by the 3-2 down-shift valve 240 and 2-1 down-shift valve 220 in a manner similar to the operation just described.

If the accelerator pedal is released from the operating position and the piston 62 of the manual valve 60 is moved from the D position to the "3" position while the transmission is in the fourth speed ratio, the line pressure is now supplied to the conduits 88 and 92 through oil passage ports 68 and 73, respectively. Since the respective shift valves 130, 160 and 190 and the respective down-shift valves 220, 240 and 260 are in their high speed positions respectively, when the transmission is at the fourth speed drive ratio, the line pressure supplied to the conduit 92 is supplied through the oil passage ports 199 and 198 of the 3-4 shift valve 190 to conduit 210 to the release chamber 285 of the first servo motor 280 to disengage the first brake 21. Also, the line pressure supplied to the conduit 88 is supplied through the oil passage ports 196 and 195 of the 3-4 shift valve 190 to conduit 208 and into the cavity 41 of the first clutch 18 to engage the first clutch 18. The line pressure supplied to the conduit 208 is supplied to the oil passage port 269 of the 4-3 or 4-2 down-shift valve 260 through conduit 274 by switching the check valve 275 so that the line pressure is applied to the right end of the piston 262 in the drawing to move the piston 262 in the leftward direction. Accordingly, the transmission is shifted to third speed drive ratio. In this case, even if the first governor pressure and throttle pressure is varied to move the piston 192 of the 3-4 shift valve 190 to either position, the line pressure is always supplied to the conduit 210 for disengaging the first brake 21 and to the conduit for engaging the first clutch 18. Thus, the transmission cannot up-shift to the fourth speed ratio. It follows that, when the piston 192 is moved to the low speed position, the oil passage port 198 is communicated with the oil passage port 197 which is supplied with the line pressure from the conduit 209, and the oil passage port 195 communicates with the oil passage port 194 supplied with the line pressure from the conduit 207.

When the accelerator pedal is released to operate the manual valve 60 to manually shift down from the fourth to the third speed drive ratio, the piston 262 of the 4–3 or 4–2 down-shift valve 260 is forced to move to the low speed position by the line pressure, with the result being that the transmission is shifted to the third speed drive ratio. This means that, upon a down-shift due to the operation of the manual valve 60, the accelerator pedal can be released so as to effect an engine brake. Accordingly, even if the engine speed is not increased, thereby providing no means for moving the piston 262 of the 4–3 or 4–2 down-shift valve 260 to the low speed position by the second governor pressure, the transmission will not remain in neutral, but will be positively down-shifted by the manual movement of piston 62 of manual valve 60.

If the manual valve 60 is operated to manually shift the transmission to the second or first speed ratio drive, the 3–2 down-shift valve 240 and 2–1 down-shift valve 220 are moved to the low speed positions, by the line pressure supplied from the conduits 89 and 90, respectively, to positively establish the completion of the low speed ratio in a manner similar to the aforementioned case.

It is understood from the foregoing description that the transmission and control system therefor constructed according to the present invention may provide an optimum control of the down-shift at a low cost.

The foregoing description, and the accompanying drawings show illustrative forms of construction according to this invention, but it will be understood that these forms are not restrictive, and that the invention may be practiced in many ways within the scope of the claims.

What is claimed is:

1. A control system for an automatic transmission comprising in combination:
   a. a drive shaft and a driven shaft;
   b. a gear set operatively connected between said drive and driven shafts, said gear set having first, second and third hydraulically actuated friction engaging means for establishing low, intermediate and high speed power trains between said two shafts;
   c. a fluid pressure supply source for supplying a fluid pressure for actuating said respective friction engaging means;
   d. hydraulic passage means communicating said fluid pressure supply source with said respective friction engaging means;
   e. a first shift valve means and a second shift valve means hydraulically connected in said hydraulic passage means, each of said shift valve means having a first position and a second position;
   f. first governor means hydraulically connected to said fluid pressure supply source and to one end of said shift valve means by said passage means, said first governor means being operatively connected to said driven shaft for producing a first governor pressure increasing in response to an increase of the speed of said driven shaft;
   g. a second governor means hydraulically connected to said fluid pressure supply source by said passage means, said second governor means being operatively connected to said drive shaft for producing a second governor pressure increasing in response to an increase of the speed of said drive shaft;
   h. a timing valve disposed in said hydraulic passage means between said fluid pressure supply source and said first friction engaging means, said timing valve being hydraulically communicated with the outputs of said first and second governor means, said timing valve having a first position communicating said fluid pressure supply source with said first friction engaging means for engaging said first hydraulically actuated friction engaging means and a second position interrupting communication of said fluid pressure supply source with said first friction engaging means, said timing valve being moved between said first and second positions in response to said first and second governor pressures;
   i. said first governor means being further hydraulically connected to said timing valve means through said first shift valve means for changing the pressure ratio of said first governor pressure applied to said timing valve when said first shift valve means is in said second position, said pressure ratio change being determined by the position of said first shift valve means;
   j. signal means in said passage means and operatively connected to a second end of each shift valve means, said first and second shift valve means selectively supplying said hydraulic fluid pressure to said friction engaging means in response to hydraulic pressure applied to said shift valve means, said first and second shift valve means being positioned in said first position to engage said first and second hydraulically actuated friction engaging means to establish said low speed power train, said first shift valve means being moved to said second position and said second shift valve means being maintained in said first position for engaging said first and third hydraulically actuated friction engaging means to establish said intermediate power train, and both said first and second shift valve means being moved to said second positions to engage said second and third hydraulically actuated friction engaging means to establish said high speed power train, whereby, when said second shift valve means is moved from said second position to said first position, in response to hydraulic pressure applied thereto, said timing valve is moved from said second position to said first position for engaging said first friction engaging means after a first lapse of time, and when both said first and second shift valve means are moved from said second positions to said first positions in response to hydraulic pressure applied thereto, said timing valve is moved from said second position to said first position after a second lapse of time greater than said first lapse of time.

2. A control system as claimed in claim 1, wherein said timing valve comprises a piston having first pressure area communicated with said first governor through said passage means, said first pressure area on which said first governor pressure from said first governor means acts directly, a second pressure area on which said first governor pressure from said first governor means acts through said first shift valve means and third pressure area on which said second governor pressure from said second governor means acts directly, said second and third pressure areas opposing said first pressure area, whereby said piston is moved to said first position to engage said first friction engaging means at the end of said first time lapse in accordance with the pressure acting on said first, second and third pressure areas of said piston when said second shift valve means is moved from said second position to said first position, and said piston is moved to engage said first friction engaging means after the lapse of said second time lapse, greater than said first time lapse in accordance with pressure acting on said first and third pressure areas of the piston when both said first and second shift valve means are moved together from said second positions to said first positions.

3. A control system for an automatic transmission comprising in combination:
   a. a drive shaft and a driven shaft;
   b. means including a gear set with first and second hydraulically actuated friction engaging means operatively connected thereto for establishing a low and a high speed power train, said gear set operatively connected between said drive and driven shafts;
   c. a fluid pressure source for supplying a first fluid pressure to said respective hydraulically actuated friction engaging means;
   d. passage means hydraulically connecting said fluid pressure source with said friction engaging means;
   e. shift valve means in said passage means hydraulically connected to said fluid pressure source and having a first position and a second position, said shift valve means selectively supplying fluid pressure to said friction engaging means for establishing said low speed power train by engaging said first friction engaging means when said shift valve means is in said first position and establishing said high speed power train by engaging said second friction engaging means when said shift valve is in said second position;

f. a first governor means hydraulically connected to said fluid pressure source and to one end of said shift valve means by said passage means and being operatively connected to said driven shaft for producing a first governor pressure increasing in response to the increase of the speed of said driven shaft;

g. a second governor means hydraulically connected to said fluid pressure source by said passage means and being operatively connected to said drive shaft for producing a second governor pressure increasing in response to the increase of the speed of said drive shaft;

h. a manual valve being hydraulically connected in said passage means, said manual valve having a low position for selectively distributing hydraulic fluid to said first hydraulically actuated friction engaging means to hold said low speed power train;

i. a timing valve disposed in an oil passage connecting said fluid pressure source to said first friction engaging means, said timing valve being hydraulically connected to said first and second governor means and to said shift valve means by said passage means, said first and second governor pressures acting in opposition to each other on said timing valve, said timing valve having a first position for completing connection of said oil passage between said fluid pressure source and said first friction engaging means and a second position for blocking said oil passage;

j. fluid pressure means supplied in response to movement of said manual valve to said low position for moving said timing valve from said second position to said first position overriding said first and second governor pressures for engaging said first friction engaging means.

* * * * *